United States Patent [19]

Palmskog

[11] Patent Number: 5,367,597
[45] Date of Patent: Nov. 22, 1994

[54] OPTICAL WAVEGUIDE ENCAPSULATION

[75] Inventor: Göran Palmskog, Järfälla, Sweden

[73] Assignee: Telefonaktiebolaget L M Ericsson, Stockholm, Sweden

[21] Appl. No.: 47,564

[22] Filed: Apr. 16, 1993

[30] Foreign Application Priority Data

Apr. 16, 1992 [SE] Sweden .................................. 9201228

[51] Int. Cl.$^5$ .............................................. G02B 6/10
[52] U.S. Cl. ..................................... 385/129; 385/141; 385/48
[58] Field of Search .................... 385/15, 43, 48, 122, 385/124, 125, 128, 129, 130, 141, 142, 147; 359/900; 250/227.24

[56] References Cited

U.S. PATENT DOCUMENTS

| | | | |
|---|---|---|---|
| 3,982,123 | 9/1976 | Goell et al. | 250/227 |
| 4,076,375 | 2/1978 | Muska et al. | 385/48 X |
| 4,135,780 | 1/1979 | Dyott | 385/48 |
| 4,779,954 | 10/1988 | Tatsukami et al. | 350/96.34 |
| 4,784,452 | 11/1988 | Hodge et al. | 350/96.15 |
| 4,801,186 | 1/1989 | Wagatsuma et al. | 350/95.30 |
| 4,802,723 | 2/1989 | Miller | 385/48 X |
| 4,844,578 | 7/1989 | Pierini et al. | 350/96.34 |
| 4,867,531 | 9/1989 | Parker et al. | 350/96.34 |
| 4,893,897 | 1/1990 | Parker et al. | 350/96.34 |
| 4,950,046 | 8/1990 | Hughes et al. | 350/96.18 |
| 5,164,589 | 11/1992 | Sjödin | 250/227.24 |

FOREIGN PATENT DOCUMENTS

| | | |
|---|---|---|
| 0027059 | 4/1981 | European Pat. Off. . |
| 0202578 | 11/1986 | European Pat. Off. . |
| 0210372 | 2/1987 | European Pat. Off. . |
| 0256765 | 2/1988 | European Pat. Off. . |
| 0328324 | 8/1989 | European Pat. Off. . |
| 0398573 | 11/1990 | European Pat. Off. . |
| 0454590 | 10/1991 | European Pat. Off. . |
| 2145841 | 4/1985 | United Kingdom . |

OTHER PUBLICATIONS

Chien et al., "Dependence of Precursor Chemistry and Curing Conditions on Optical Loss Characteristics of Polyimide Waveguides," *SPIE*, vol. 1323 Optical Thin Films III: New Developments (1990), pp. 338-347 (no month).

Filas et al., "Index-Matching Eleastomers For Fiber Optics," *IEEE*, pp. 486-489 Mar. 1989.

One sheet of drawing bearing the legends "Cross section of tight buffered fiber" and Cross section of fiber in a loose tube, Mar. 13, 1991.

Patent Abstracts of Japan, Abstract No. 61090108(1), vol. 10, No. 264, Sep. 9, 1986.

*Primary Examiner*—John D. Lee
*Assistant Examiner*—Phan Thi Heartney
*Attorney, Agent, or Firm*—Burns, Doane, Swecker & Mathis

[57] ABSTRACT

An optical waveguide encapsulation for facilitating the tapping of light signals. The optical waveguide includes an optical medium, preferably a polyimide. An encapsulating material comprises a medium which matches the index of the light conducting core of the waveguide. The refractive index of the light conducting core is higher than the refractive index of the encapsulating material, and the encapsulating material is an elastic material.

14 Claims, 2 Drawing Sheets

OPTICAL WAVEGUIDE ENCAPSULATION

TECHNICAL FIELD

The present invention relates to an optical waveguide encapsulation for facilitating the tapping of light signals, said optical waveguide comprising an optical medium, preferably polyimide.

BACKGROUND ART

In present day fiberoptic communication fields, and in particular within the telecommunication field, it is desirable to be able to tap light signals in order to ascertain the traffic status of the optical fiber. At present, the light signals are tapped on the fiber with the aid of a permanently attached tapping device. The fiber is comprised of a light conducting core and a cladding. In order to make the light signal accessible to the tapping device, either the cladding is removed at the tapping site or the fiber is bent. The tapping device functions to tap the light signal from the core through its evanescence field.

U.S. Pat. No. 3,982,123 discloses two methods of tapping a light signal from an optical fiber without requiring the fiber to be broken. The concept of this patent is to look into the fiber so as to ascertain its traffic status, and signal tapping can be effected anywhere whatsoever without disturbing the traffic. This is achieved by placing the tapping device, which in this case is comprised of a material which incorporates a photodetector, on a light conducting core or on the fiber so that tapping of light signals can be effected. The optical fiber is comprised of a core that has low optical losses and cladding which has a lower refractive index than the core.

A first method described in the patent involves removing all, or practically all of the cladding material from the fiber. The detector is then placed securely on the light conducting core, the stripped region of which must be at least three times the wavelength in the optical fiber.

Another method of tapping light signals is to bend the optical fiber without removing the cladding material. This enables the light signals to be extracted through the cladding and captured by a photodetector. Tapping is effected permanently in both cases.

U.S. Pat. No. 4,784,452 describes a method in which tapping is effected with the aid of a tapping device placed on an optical fiber. This fiber is comprised of a light conducting core and at least one cladding material. The tapping device, a probe, is an optical fiber of the same type as the fiber from which the signals are tapped. This probe has a free end which includes a light conducting core. In order to tap light signals from the fiber, it is necessary to remove the cladding so as to expose the core. The probe is used at this exposed region, with the free end of the probe placed against the bared part of the fiber. In order to obtain the best possible tapping effect, it is necessary to adapt the angle defined by the probe axis and the fiber axis. A coupling medium connects the region at the probe and the bared part of the fiber and conducts light signals from the bared part of the fiber to the probe. The coupling medium, which is a solid and hard material, fixes the probe in relation to the fiber.

Various experiments have shown that the light conducting core may be comprised of polyimide. In the article "Dependence of Precursor Chemistry and Curing Conditions on Optical Loss Characteristics of Polyimide Wageguides" by C. P. Chien and K. K. Chakravorty at Boeing Aerospace and Electronics, Seattle, USA, SPIE vol 1323, Optical Thin Films III, New developments (1990), it is disclosed that polyimide is a good material for the optical fiber core. Polyimide has good thermal stability and a dielectric index of 3.5, which is compatible with other IC-materials. The material functions well as a light transmitter, such as in optoelectric circuits in GHz frequency range. The advantage of polyimide is that when manufacturing cores, the cores can be packed tightly together. Additional polyimide data is that it has a refractive index of 1.6 (1.58–1.62) and optical losses in the core of about 1 dB/cm when exposed to ultraviolet light.

Experiments have been carried out with a silicone elastomer as an index matching medium for the light conductive core. The article "Index Matching Elastomers for Fiber Optics" by Robert W. Filas, B. H. Johnson and C. P. Wong at AT&T Bell laboratories, N.J. USA in the magazine IEEE, Proc. Electron. Compon. Cont., 39th, 486–9, disclose that silicone elastomers are good core index matching materials. Copolymer reflection as a function of the diphenyl concentration and temperature is obtained by measuring the reflection strength of a single mode waveguide whose core has been encapsulated in an elastomer. It is possible to obtain the same refractive index on a silicone rubber material as the refractive index of the core. The silicone rubber can be used as an interface between different components. Another method is to use the silicone rubber as protection against moisture and dust, for instance.

At present, air is used as the refractive medium to the light conducting core of the lightwave conductor. Air has a much lower refractive index than polyimide. The refractive index of air is 1, whereas the refractive index of the polyimide is 1.6 and the refractive index of the silicone rubber is 1.5.

One drawback with the earlier known solutions is that light signals are tapped from optical fibers with the aid of permanently attached devices. This means that light signals are tapped from the fiber at a specific place thereon at which cladding has been removed. The earlier solutions are encumbered with a number of additional drawbacks. One of these drawbacks is that light signals can only be tapped on fiber waveguides and that it is necessary to remove cladding from the place at which tapping shall take place. The tapping device must be placed firmly on the optical fiber at that place from which the cladding has been removed. Tapping in permanent branches results in excessively high losses.

SUMMARY OF THE INVENTION

The object of the present invention is to provide an optical waveguide which will enable light signals to be tapped in a simpler fashion, in the absence of those drawbacks possessed by earlier solutions.

The inventive concept is to encapsulate the optical waveguide in an elastic encapsulating material, an elastic cladding. Because the encapsulating material is elastic, a tapping device, a probe, can be pressed down into the cladding and towards the light conducting core. This enables the probe to take light from the evanescence field surrounding the core and therewith enable tapping to be effected without needing to remove part of the cladding material.

The invention relates to a material selection with which an intended physical waveguide property is obtained in a simple fashion. The novel feature resides in replacing the waveguide cladding with an elastic encapsulating material, for instance silicone rubber.

In one case, the optical waveguide is a lightwave conductor and in the other case an optical fiber. The two optical waveguides differ from one another insomuch that the light waveguide is seated firmly on a substrate which includes a thin layer, a light conducting core and an encapsulating material, whereas the optical fiber is comprised of a light conducting core and the encapsulating material.

According to a first alternative, the encapsulating material is used as a protective covering which extends fully over the light conducting core and over those components which are connected to a light waveguide. The light waveguide and the components are firmly mounted on the substrate. The encapsulating material is an elastic material and is also optically transparent, and has three different functions. The first of these functions is to cover the core so as to obtain an index matching medium which will not conduct light signals out of the core. The second of these functions is to act as a light conducting layer between the end of the light waveguide and a component which delivers or receives light signals, for instance, a laser diode. It is used as a coupling material for conducting the light signals to/from the laser diode from/to the core. The numerical aperture on the light is controlled with the aid of the refractive index of the encapsulating material. The encapsulating material lies outside the window of the laser diode. The third function of the encapsulating material is to protect the components and the core against external influences, in those cases when several components are mounted on the substrate, for instance connecting devices.

According to another alternative, the optical fiber cladding is comprised of the encapsulating material provided around the light conducting core.

The invention provides the advantage that light signals can be tapped without needing to fix the tapping device permanently at a given tapping site on the optical waveguide. Another advantage is that it is possible to tap light from the light waveguide when the waveguide is seated firmly on the substrate. Light signals have not previously been tapped from substrate mounted light waveguides. Thus, it will be seen that light signals can be readily tapped from such a system. Further advantages lie in the fact that tapping can be carried out temporarily if so desired, and that the elastic encapsulation protects against external environmental influences, such as dust, air and humidity, during a light tapping process.

Further objects of the invention and advantages afforded thereby will be evident from the preferred embodiments described below with reference to the accompanying drawings.

BRIEF DESCRIPTION OF THE DRAWING

FIG. 1 is a top view of a light waveguide mounted on a silicon disc.

FIG. 2 is an enlarged cross-sectional view of the light waveguide on the silicon disc, taken on the line A—A in FIG. 1.

FIG. 3 is an enlarged cross-sectional view of the light waveguide on the silicon disc, taken on the line B—B in FIG. 1.

FIG. 4 is a sectional view of the optical fiber.

BEST MODE OF CARRYING OUT THE INVENTION

The Figures of the accompanying drawings have not been drawn scale and solely illustrate those parts which are necessary obtain an understanding of the inventive concept.

Figure 1:
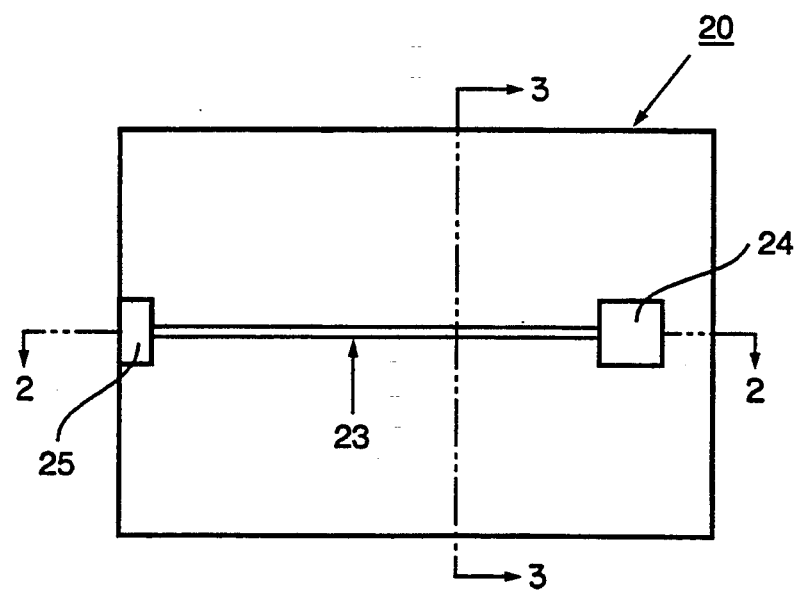
Figure 2:
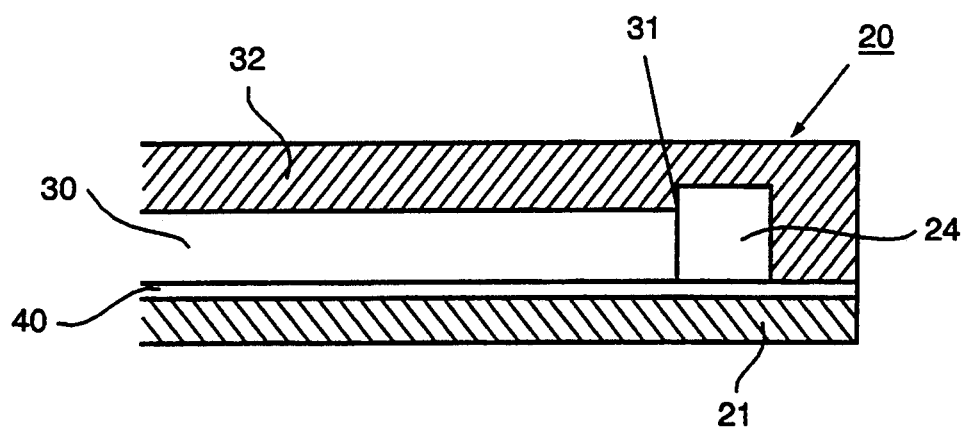
Figure 3:
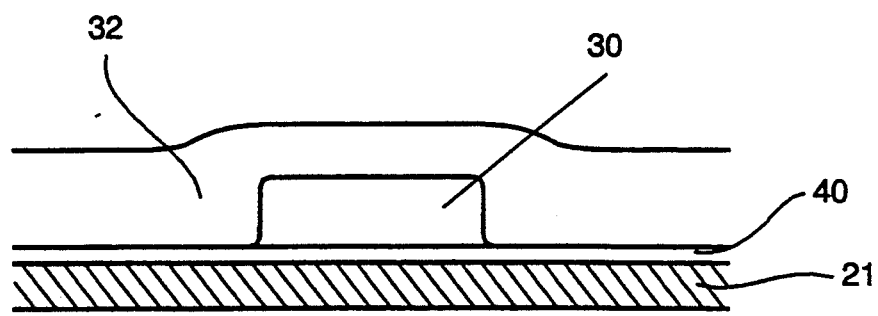

A first embodiment is illustrated in FIGS. 1-3. FIG. 1 illustrates an arrangement 20 comprising a substrate 21, a connecting device 25, a light waveguide 23 and an optical component 24 which emits or receives light.

FIG. 2 is a sectional view of the arrangement 20 shown in FIG. 1 taken on the line A—A in said Figure and on the optical component 24. Mounted on the substrate 21 is a very thin layer 40 which is intended to function as a refractive medium for a light conducting core 30. A very narrow gap 31 is found between one end of the core 30 and the component 24. The connecting device 25 is connected directly to the other end of the core 30. An elastic encapsulating material 32 is provided on top of the component 24 and the core 30.

FIG. 3 is an enlarged sectional view of the light waveguide 23 shown in FIG. 1 taken on the line B—B in said Figure. FIG. 3 illustrates the light waveguide, which is comprised of the light conducting core 30, the thin layer 40 on the substrate 21 and the encapsulating material 32. The encapsulating material has a lower refractive index than the core 30. The layer 40 lies on the substrate 21 and the core 30 lies on top of the layer 40. The encapsulating material 32 covers everything on the substrate 21.

The substrate 21 illustrated in FIG. 1 is a silicon disc of the kind typical for semiconductors. The disc may have several light waveguides 23, components 24 and connecting devices 25 mounted thereon. The substrate 21 may also be comprised of circuit board material, a glass material or any other type of material, provided that the substrate 21 has a lower refractive index than the core 30. It is important that attenuation in the core 30 will be as low as possible.

The light waveguide 23 of the FIG. 2 and 3 illustrations is comprised of three separate parts, i.e. the thin layer 40 seated on the substrate 21, the core 30 and the encapsulating material 32. The layer 40 is comprised of silicon dioxide while the substrate 21 is comprised of silicon. The substrate must have a lower refractive index than the core 30 so that it will not conduct light therefrom. The light conductive core 30 is screened in the form of thin wires or filaments and has a width of 5-10 $\mu m$ for single mode and a width 40-100 $\mu m$ for multimode. In mounting the core 30, there is used a photopatternable polyimide which may be one of two different types, either probimide 412 or probimide 348. These polyimides are wet etched on the substrate 21. Wet etching is an inexpensive and simple production technique in the manufacture of light conducting cores 30. The aforesaid method can also be applied when the substrate 21 is large, for instance a complete circuit board. Other substances from which the core 30 can be made include acrylate, polymethacrylate and polystyrene. Non-photopatternable polyimides are available in which the structure can be etched. When choosing a single mode, it is slightly more difficult to obtain the correct refractive index, since the encapsulating material must then be more well defined than in the case of a multimode.

The optical components 24 may, for instance, comprise a laser diode or a light emitting diode. When the substrate 21 is made of silicon, silicon dioxide is first applied to the thin layer 40, so as to obtain the correct refractive index. The core 30 is comprised of said polyimide material and is wet etched on the silicon dioxide. Gold electrodes are then applied in the place where the laser diode is mounted, for the purpose of delivering current to the laser diode. The laser diode, measuring 0.2×0.3 mm, is soldered firmly to the substrate 21, which measures about 5×5 mm. The laser emitting part of the laser diode, the window, measures 1.5×1 $\mu$m where the laser diode conducts light to the light waveguide. Another component of the FIG. 1 arrangement is the connecting device 25, which is a simple connecting device. Finally, the assembly is encapsulated in an encapsulating material, for instance silicone rubber.

One area which becomes very hot is the laser diode area. This is because the laser diode emits considerable heat. This heat can be dissipated by means of a small diamond disc used as a heat conveyor. This prevents the encapsulating material becoming so hot as to degrade and decompose the material. In the FIG. 2 embodiment, the encapsulating material 32 is silicone rubber, which is a type of elastomer. The encapsulating material 32 functions to enable light signals to be tapped from the light conducting core 30. Since the encapsulating material is elastic, a light conducting probe can be pushed into the elastic encapsulating material and down towards the core 30. The silicone rubber is optically conductive. The encapsulating material 32 can be placed on the substrate 21 carrying the components 24 and 25 while it is still moldable, and thereafter allowed to harden, so that the silicone rubber becomes elastic. Since the silicone rubber is also able to control the numerical apertures, the wave guiding properties, it is well suited as a refractive medium. The use of silicone rubber provides a protective covering over the components 24, 25 and the light conducting core 30, this covering layer also providing good optical properties at the same time. Furthermore, the rubber is elastic and is able to take up thermal stresses. The encapsulating material 32 is used on three locations on the substrate 21: Firstly, the encapsulating material 32 encapsulates the core 30. Secondly it encapsulates the components 24 and 25. Thirdly it functions as an index matching medium between the core 30 and the optical component 24. The numerical aperture is controlled by the index matching medium with the aid of the refractive index.

The encapsulating material 32 can be laid in several different ways. One way is to press out a small bead of encapsulating material 32 onto the substrate 21 and then smooth-out said material over the substrate, in a manner similar to that used when applying surface fillers. Another method is the spinning method. This spinning technique involves placing the encapsulating material 32 in the centre of the substrate 21 and then rotating the substrate in a spinning machine so that the encapsulating material 32 is spread over the whole of the substrate 21 by the centrifugal forces generated, in a simple and effective manner. This technique results in the encapsulating material 32 being evenly and thinly spread over the substrate 21.

The aforedescribed arrangement 20 is used in a method of tapping a light signal with the aid of a light conducting probe that is applied directly onto the optical waveguide. By forcing the probe down through the elastic encapsulating material 32, it is possible to come so close to the light conducting core 30 as to take-up the evanescence field that surrounds the core 30. Practically no losses are experienced in the core 30. It is important that the probe is not inserted too far into the encapsulating material, because the encapsulation may then be permanently deformed. On the other hand, if the probe is not inserted sufficiently far into the encapsulating material 32, it will be unable to take up the evanescence field. The distance between the probe and the core 30 must be in the correct order of magnitude, less than $\mu$m. A measuring instrument can be used to ensure that the same, correct distances are obtained with each tapping operation.

The method is as follows:

In a first step, the fiber end of the light conducting probe is pressed down against the encapsulated optical waveguide. In a second step, the fiber end of the probe is pressed into the encapsulating material 32 while elastically deforming said material to an extent permitted by the elastic properties of the material or so that the residual deformation, yield, does not become permanent. In a final step, the fiber end of the probe is angled to the optical waveguide 23, so that a part of the light signal will be taken up by the probe. The probe is angled so as to tap a given light signal. If the angle is changed, another light signal is obtained in the probe.

It should be noted that the fiber end of the light conducting probe is equally as wide as the optical waveguide, so as to obtain the best possible tapping. Furthermore, the probe shall be manufactured from the same material as the light conducting core or from a material which has an equally as large or a larger refractive index. The probe may also be manufactured from a plastic fiber.

The method also enables the light conducting probe to be permanently fixed to the optical waveguide, if so desired. The probe is removed upon completion of a light signal tapping operation, with no residual deformation of the encapsulation. When tapping light signals on light waveguides, no further measures need be taken to enable tapping to take place.

Figure 4:
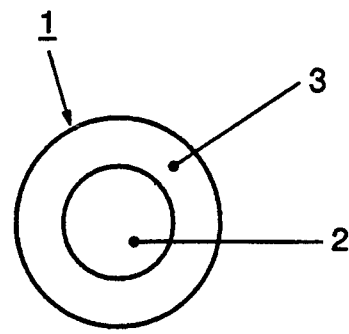
FIGS. 1-3 illustrate a first embodiment of the invention and FIG. 4 illustrates a second embodiment.

Another embodiment of the arrangement is illustrated in FIG. 4. FIG. 4 illustrates an optical fiber 1 which is comprised of a light conducting core 2 and an elastic encapsulating material 3. The core 2 may comprise, for instance, polyimide and has a higher refractive index than the encapsulating material 3. The core encapsulation is comprised of the elastic material, which is preferably silicone rubber. Because the material is elastic, a tapping device, the probe, can be inserted into the encapsulating material 3 and tapping can take place when the probe has reached the evanescence field. The tapping device can be removed when desired. The optical fiber 1 may extend between different telephone stations or, for instance, between different computers. The optical fiber may extend over large distances, and it is sometimes necessary to investigate the optical fiber to ascertain the traffic status of the fiber. The illustrated fiber 1 is not supported by a substrate, but lies freely.

Optical fibers 1 can be tapped in the same way as that described with reference to the light waveguide 23. Before commencing the first method step, the fiber 1 must be placed on a hard supporting surface in order for tapping to take place. When the optical fiber 1 is not too flexible, a probe can be inserted into the fiber without supporting it on a hard surface.

It is quite expensive to encapsulate laser diodes when using present day metal encapsulating techniques. One of the advantages with encapsulating the components on the substrate is that it is relatively inexpensive. Another advantage with using encapsulating material that has elastic properties is that a probe can be pressed into the material and light signals tapped. Another advantage is that an optical waveguide according to the aforedescribed embodiments can be produced inexpensively and simply. The method also enables light signals to be tapped from optical waveguides on temporary occasions. A further advantage with the use of an elastic encapsulating material is that the material is able to take up the movements that derive from the optical components when they become hot.

It will be understood that the invention is not restricted to the aforedescribed and illustrated embodiments thereof and that modifications can be made within the scope of the accompanying claims.

I claim:

1. An encapsulation device of optical waveguides, said device comprising:
   an underlayer; and
   at least one optical waveguide, supported by said underlayer, said at least ..one optical waveguide including a light conducting core, a coating which has a refractive index which is lower than the refractive index of the light conducting core and a layer including a material with a refractive index which is lower than the refractive index of said light conducting core of said waveguide, said layer extending over at least a part of said surface of the underlayer,
   wherein the light conducting core extends over said layer and is adjacent to a surface of said layer, and
   said coating covers the light conducting core and is adjacent to said surface of the layer next to said light conducting core, and
   the underlayer comprises a disc and said layer is on said disc.

2. An encapsulation device according to claim 1, wherein said disc is made of silicone and said layer is made of silicone dioxide.

3. An encapsulation device according to claim 2, wherein said coating is made of an elastic material.

4. An encapsulation device according to claim 3, wherein the elastic material is a silicone elastomer.

5. An encapsulation device according to claim 1, wherein said coating is made of an elastic material.

6. An encapsulation device according to claim 5, wherein the elastic material is a silicone elastomer.

7. An encapsulation device of optical waveguides, said device comprising:
   an underlayer; and
   at least one optical waveguide, supported by said underlayer, said at least one optical waveguide including a light conducting core, a coating which has a refractive index which is lower than the refractive index of the light conducting core and a layer including a material with a refractive index which is lower than the refractive index of said light conducting core of said waveguide, said layer extending over at least a part said surface of the underlayer,
   wherein the light conducting core extends over said layer and is adjacent to a surface of said layer, and
   said coating covers the light conducting core and is adjacent to said surface of the layer next to said light conducting core, and
   said light conducting core is made of a photo-patternable polymeric material.

8. An encapsulation device according to claim 7, wherein said polymeric material is a polyimid.

9. An encapsulation device according to claim 8, wherein said coating is made of an elastic material.

10. An encapsulation device according to claim 9, wherein the elastic material is a silicone elastomer.

11. An encapsulation device according to claim 7, wherein said coating is made of an elastic material.

12. An encapsulation device according to claim 11, wherein the elastic material is a silicone elastomer.

13. An encapsulation device of optical waveguides, said device comprising:
    an underlayer; and
    at least one optical waveguide, supported by said underlayer, said at least one optical waveguide including a light conducting core, a coating which has a refractive index which is lower than the refractive index of the light conducting core and a layer including a material with a refractive index which is lower than the refractive index of said light conducting core of said waveguide, said layer extending over at least a part of said surface of the underlayer,
    wherein the light conducting core extends over said layer and is adjacent to a surface of said layer, and
    said coating covers the light conducting core and is adjacent to said surface of the layer next to said light conducting core, and
    said coating is made of an elastic material.

14. An encapsulation device according to claim 13, wherein the elastic material is a silicone elastomer.

* * * * *